(12) United States Patent
Shepherd et al.

(10) Patent No.: US 11,521,351 B2
(45) Date of Patent: Dec. 6, 2022

(54) ASSOCIATING OBJECT PROPERTY DATA WITH LOCATIONS

(71) Applicant: HEWLETT-PACKARD DEVELOPMENT COMPANY, L.P., Houston, TX (US)

(72) Inventors: Josh Shepherd, Vancouver, WA (US); Matthew A Shepherd, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1160 days.

(21) Appl. No.: 16/075,633

(22) PCT Filed: Jul. 10, 2017

(86) PCT No.: PCT/US2017/041300
§ 371 (c)(1),
(2) Date: Aug. 4, 2018

(87) PCT Pub. No.: WO2019/013740
PCT Pub. Date: Jan. 17, 2019

(65) Prior Publication Data
US 2021/0209845 A1    Jul. 8, 2021

(51) Int. Cl.
*G06T 17/20* (2006.01)
*G06T 19/00* (2011.01)
(Continued)

(52) U.S. Cl.
CPC ............ *G06T 17/10* (2013.01); *B29C 64/393* (2017.08); *B33Y 10/00* (2014.12); *B33Y 50/02* (2014.12);
(Continued)

(58) Field of Classification Search
None
See application file for complete search history.

(56) References Cited

U.S. PATENT DOCUMENTS 6,784,894 B2    8/2004   Schimpf et al.
7,317,456 B1 *  1/2008   Lee ........................ G06T 17/00
                                                            345/427
(Continued)

FOREIGN PATENT DOCUMENTS

CN   102664321      9/2012
CN   102725201 A   10/2012
(Continued)

OTHER PUBLICATIONS

Samuli Laine, "A Topological Approach to Voxelization", 2013, (10 pages).
(Continued)

*Primary Examiner* — Joni Hsu
(74) *Attorney, Agent, or Firm* — HP Inc. Patent Department

(57) ABSTRACT

In an example, a method includes acquiring, at a processor, a data model of an object to be generated in additive manufacturing, the data model comprising object model data representing a slice of the object model as a plurality of polygons and object property data comprising property data associated with the plurality of polygons. The slice may be inspected from a predetermined perspective at a plurality of discrete locations. It may be determined if each location is within a face of a polygon, and if so, the object property data associated with that polygon may be identified and associated with that location. The slice may further be inspected at a plurality of discrete locations along an edge of a polygon, the object property data associated with each location may be identified and associated with that location.

14 Claims, 5 Drawing Sheets

(51) Int. Cl.
*G06T 15/00* (2011.01)
*G06T 17/10* (2006.01)
*B33Y 10/00* (2015.01)
*B33Y 50/02* (2015.01)
*G06T 7/13* (2017.01)
*B29C 64/393* (2017.01)
*G06F 30/23* (2020.01)
*G06F 30/10* (2020.01)
*G06F 113/10* (2020.01)

(52) U.S. Cl.
CPC .............. *G06F 30/10* (2020.01); *G06F 30/23* (2020.01); *G06T 7/13* (2017.01); *G06T 15/00* (2013.01); *G06T 17/20* (2013.01); *G06T 19/00* (2013.01); *G06F 2113/10* (2020.01); *G06T 17/205* (2013.01); *G06T 2219/008* (2013.01)

(56) References Cited

U.S. PATENT DOCUMENTS

| | | | |
|---|---|---|---|
| 2004/0184655 A1* | 9/2004 | Ziegler | G06T 17/10 382/154 |
| 2005/0151735 A1 | 7/2005 | Boekhorst | |
| 2005/0154481 A1* | 7/2005 | Berger | B33Y 50/00 700/98 |
| 2010/0231664 A1 | 9/2010 | Steinmetz et al. | |
| 2013/0297059 A1 | 11/2013 | Grifith et al. | |
| 2014/0031967 A1 | 1/2014 | Unger et al. | |
| 2014/0132601 A1 | 5/2014 | Raghoebardayal et al. | |
| 2014/0309491 A1 | 10/2014 | Karasawa | |
| 2015/0317412 A1* | 11/2015 | Iverson | B29C 64/393 700/98 |
| 2016/0059489 A1 | 3/2016 | Wang et al. | |
| 2017/0087771 A1 | 3/2017 | Brunermer et al. | |
| 2017/0148182 A1* | 5/2017 | Yoshida | G06T 19/00 |
| 2017/0217103 A1* | 8/2017 | Babaei | B33Y 30/00 |
| 2018/0108170 A1* | 4/2018 | Matsubara | H04N 1/00 |
| 2020/0122399 A1* | 4/2020 | Bigos | G06T 17/00 |

FOREIGN PATENT DOCUMENTS

| | | |
|---|---|---|
| CN | 204196254 U | 3/2015 |
| CN | 105825471 A | 8/2016 |
| JP | 2001077877 A | 3/2001 |
| JP | 2008201543 A | 9/2008 |
| WO | 2016169614 A1 | 10/2016 |

OTHER PUBLICATIONS

Fei et al., "Point-tessellated Voxelization", Retrieved from Internet: http://www.cs.columbia.edu/~fyun/gi12/paper100.pdf, May 5, 2012, 9 pages.

Samuli Laine, "A Topological Approach to Voxelization", 2013, (10 pages), Jul. 2013.

Masaya Takeshige, "The Basics of GPU", Mar. 22, 2015, (14 pages).

* cited by examiner

ASSOCIATING OBJECT PROPERTY DATA WITH LOCATIONS

BACKGROUND

Three-dimensional (3D) printing is an additive manufacturing process in which three-dimensional objects may be formed, for example, by the selective solidification of successive layers of a build material. The object to be formed may be described in a data model. Selective solidification may be achieved, for example, by fusing, binding, or solidification through processes including sintering, extrusion, and irradiation. The quality, appearance, strength, and functionality of objects produced by such systems can vary depending on the type of additive manufacturing technology used.

BRIEF DESCRIPTION OF DRAWINGS

Non-limiting examples will now be described with reference to the accompanying drawings, in which.

DETAILED DESCRIPTION

Figure 1:
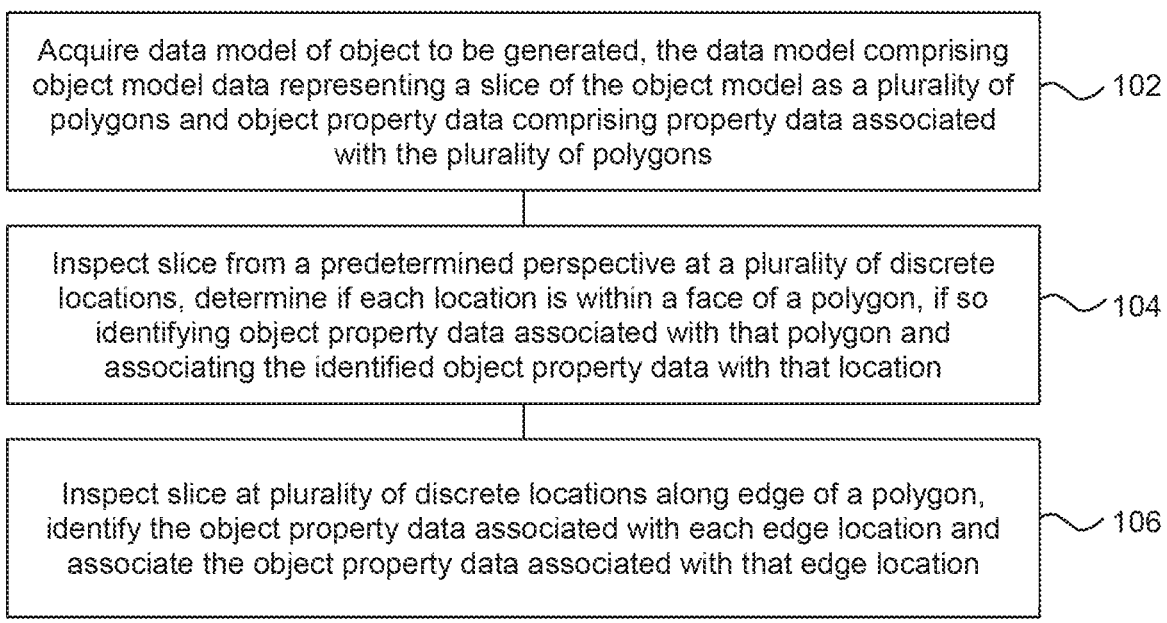
FIG. 1 is an example of a method for associating object properties with locations in object model data.

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

In addition to a fusing agent, in some examples, a print agent may comprise a coalescence modifying agent, which acts to modify the effects of a fusing agent or energy applied for example by preventing, reducing or increasing coalescence or to assist in producing a particular finish or appearance to an object, and such agents may therefore be termed detailing agents. A property modification agent, for example comprising a dye, colorant, a conductive agent, an agent to provide transparency or elasticity or the like, may in some examples be used as a fusing agent or a modifying agent, and/or as a print agent to provide a particular property for the object.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate parallel slices of the model. Each slice may define a portion of a respective layer of build material that is to be solidified or caused to coalesce by the additive manufacturing system.

In some examples, the slice of the object model may be one 'voxel' thick. In some examples of additive manufacturing, three-dimensional space may be characterised in terms of such voxels, i.e. three-dimensional pixels, wherein each voxel occupies or represents a discrete volume. In some examples, the voxels are defined bearing in mind the print resolution of a print apparatus, such that each voxel represents a volume which may be uniquely addressed when applying print agents, and therefore the properties of one voxel may vary from those of neighbouring voxels. In other words, a voxel may correspond to a volume which can be individually addressed by a print apparatus (which may be a particular print apparatus, or a class of print apparatus, or the like) such that the properties thereof can be determined at least substantially independently of the properties of other voxels. For example, the 'height' of a voxel may correspond to the height of a layer of build material. In some examples, the resolution of a print apparatus may exceed the resolution of a voxel. In general, the voxels of an object model may each have the same shape (for example, cuboid or tetrahedral), but they may in principle differ in shape and/or size. In some examples, voxels are cuboids, based on the height of a layer of build material. In some examples, in processing data representing an object, each voxel may be associated with properties, and/or to print instructions, which apply to the voxel as a whole.

For example, a voxel may be represent a cuboid region of space have dimensions of 42 µm in the plane of the slice/layer (in xy) and 80 µm in height (the z direction).

FIG. 1 shows an example of a method which may be a computer implemented method, for example carried out using at least one processor, and may comprise a method of associating object properties with locations in object model data.

Block 102 comprises acquiring, at a processor, a data model of an object to be generated in additive manufacturing, the data model comprising object model data representing a slice of the object as a plurality of polygons and object property data comprising property data associated with the plurality of polygons. The data may for example be held in or received from a memory, received over a network, received over a communications link or the like, or acquired in some other way.

In some examples, the data model may be acquired following generation thereof by the processor or another processor. In some examples, slices of the object model may be acquired following the generation thereof from data modelling the object in its entirety, for example by considering the data in 'slices' bounded by two spaced planes, and in some examples generating a mesh of the slices (for example, the surfaces thereof, using a method as outlined in relation to FIG. 2 below), or by sampling the object at each of a plurality of planes.

The object model data may define a three-dimensional geometric model of at least a portion of the model object, including the shape and extent of all or part of an object in a three-dimensional co-ordinate system, e.g. the solid portions of the object. The data model represents the object as a plurality of polygons, in what may be described as a 'mesh model'. The polygons may be of a common type, for example, comprising triangles. In some examples, the mesh model may represent the surface(s) of the object. The object model data may for example be generated by a computer aided design (CAD) application.

Object properties may be specified in the object property data for example to define at least one object property for the three-dimensional object to be generated. In one example, the object property data may comprise any or any combination of visual and/or mechanical properties, for example color, flexibility, elasticity, rigidity, surface roughness, porosity, inter-layer strength, density, conductivity and the like for at least a portion of the object to be generated. Object property data may define multiple object properties, and/or the object properties may vary over the object, for example such that different portions of an object may have one or more properties which may differ between portions. In some examples the object properties may be specified as a 2D map of a property over the polygons describing the object. This may for example comprise a 'texture map'. A texture map is an image file that can be applied to the surface of a 3D model to add color, texture, or other surface detail like glossiness, reflectivity, or transparency. In some examples, texture maps correspond to an 'unwrap' model of a mesh surface, in which the polygons are arranged so as to lie in a 2D plane, and may be described by a uv coordinate system (as compared to the xyz coordinate system used to describe the object in 3D). Therefore a texture map may be associated with the surface so as to correspond with the uv coordinates of an unwrapped 3D model. For example, coordinates in a 2D or 3D property map may be associated with the vertices (i.e. corners) of the polygons of the object.

For example, coordinates in a property map associated with the object as defined by the polygons may be associated with the vertices (i.e. corners) of the polygons. In some examples, a model of an object may be expressed in two parts: (a) object model data representing the object as a plurality of initial polygons, i.e. a mesh, which has 3D rectilinear coordinates in xyz and (b) object property data, e.g. bitmap(s), which have 2D rectilinear coordinates in uv (the uv space is effectively the bitmap xy space, but is termed uv to avoid confusion with the 3D coordinate system). In other examples, 3D property maps (e.g. 3D texture maps) may be provided.

In one example, the polygon mesh is a triangular mesh of the surfaces of the object and each triangle in the mesh has three vertices and six pieces of information—the xyz coordinates v0, v1 and v2 (the location of the polygon vertices in 3D space) and the uv coordinates uv0, uv1, and uv2 (the location of the vertices in the 2D space of the bitmap(s)). The uv coordinates may not have the same shape as the xyz coordinates, they can be three arbitrary points (or even the same point(s)) on the bitmap(s)). Further, they can be independently determined for each polygon, where one polygon's uv coordinates in general don't affect any other polygon's uv coordinates. In this way, the properties at the vertices are given by the uv coordinates. For the remainder of a given polygon (the edges and interior), these properties may be linearly interpolated from the three uv vertices.

While the example of a triangle has been used here, the mesh may be based on a different polygon, and the mesh may represented the interior of the object as well as the surface, for example comprising a tetrahedral mesh. In such a mesh, the properties may again be defined at the vertices.

In other examples properties may be mapped to a polygon mesh in a different manner, for example each polygon may have a particular fixed property, or the like.

In some examples, the slice of the object model may be one 'voxel' thick, and/or have a thickness corresponding to a thickness of a layer of a layer by layer additive manufacturing process.

Block 104 comprises inspecting, using the processor, the slice from a predetermined perspective at a plurality of discrete locations and determining if each location is within a face of at least one polygon, and if so, identifying the object property data associated with that polygon and associating the identified object property data with that location. Each location may correspond to a voxel, such that the inspection may be carried out on a 'voxel by voxel' basis. In other words, the content of a region of space corresponding to a voxel (or any property value for a location representing the voxel, for example the centre of a voxel) may be determined and, if the inspected location is within the face of at least one polygon, the property data for that polygon may be associated with that location. Conceptually, this may be thought of as inspecting the model of a slice along a plurality of spaced rays projected through the slice from a virtual plane which is parallel to the plane of the slice, each being projected from a different location in the virtual plane. If a polygon is encountered by the ray (which may for example be projected through the centre of a voxel), the property (e.g. color) for the location is obtained, for example from a 2D texture map, for example using the uv location. Expressed another way, it may be determined whether at least one polygon of the slice overlies the location when viewed from the perspective, and if so, the object property data of the polygon may be associated with the location.

Techniques for resolving the selection in the event that more than one property is identified/encountered are discussed below.

Block 106 comprises inspecting the slice at a plurality of discrete edge locations along an edge of a polygon and associating the object property data associated with that edge location, for example from a texture map or the like.

Block 106 may therefore conceptually comprise 'walking' along each of the edges of the polygons defining the slice and 'sampling' the slice in a parametrised fashion (for example, with a spacing such that each xyz location, or each voxel, is inspected at least once). In some examples, the inspected locations are selected as floating-point xy locations and are converted into voxel centre locations by rounding (wherein the rounding may be designed such that it performs in a consistent manner). In other words, in such an example, a number in floating-point or "real number" space is rounded into integer voxel xy locations (whereas block 104 may comprise performing inspections at integer voxel xy locations, which may in some examples be converted into the floating-point location in the xy coordinates of the model space to identify a property).

In other words, block 104 may be carried out in integer voxel space, designated V herein for the sake of example. V space only has integer values, e.g., {0,1,2,3 . . . }, counting the voxels as integers, and may be transformed into floating point space to identify a property (for example, the property which may be associated with the centre of a voxel, as may be determined by interpolation of property data values specified for a polygon containing the face of the voxel. However, the space in which block 106 is carried out may not be so constrained. For example, this may be carried out in a "floating point model space" (which may also be space in which the polygons are specified). Floating point model space is designated M space herein for the sake of this example.

The process of identifying object property data carried out in block 104 may therefore comprise a mathematical conversion from V space in M space (which is relatively straightforward in that it does not result in loss of data). In contrast, in process carried out in block 106, a conversion of M space into V space may be performed, in order to associate an inspection location with a voxel. As V space is effectively specified at a coarser resolution to M space, this conversion results in a loss of precision, which is effectively a loss of data. The transform from M space to V space may be designed so as to have no bias with regards to the corresponding transform from V space to M space. To that end, the transform may be carried out to comprise rounding and not, for example, truncation with attention to what the integer locations V mean in floating point M. The design of the forward (V- to M-space) and reverse (M- to V-space) transform may be determined so as to avoid bias one direction or the other during voxelisation, for example such that the inspections carried out in block 106 line up with the inspections carried out in 104 for all floating point values that the edges can take in block 106.

In summary therefore, block 104 may comprise using a V space to M space transform which is fully compatible with an M space to V space transform which may be used in block 106. A transform used in block 106 may comprise a rounding transform.

It may be noted that, in the method of FIG. 1, the slice is inspected in two ways: first, in block 104, the slice may be inspected in one direction (which may be 'end on' in the direction of object generation, generally the Z direction herein). However, in this view, polygons (i.e. in some examples, object surfaces) which are steep or vertical relative to this perspective may have an effective thickness which is 'too thin' (including 0 thickness) to produce an accurate 3D physical model; i.e. they may be 'missed' in the discrete inspections of block 104, which may be carried out at voxel spacing, as may other locations in some examples. Therefore, in a subsequent process, in block 106, the edges of the polygons in the slice are considered, and properties may be associated with individually print addressable areas (i.e. a voxel.

The method may be carried out for each of a plurality of slices, in some examples until the object has been inspected in its entirety.

As is discussed in greater detail below, both of blocks 104 and 106 may comprise associating object property with voxels. In some examples, object property data may be identified in both blocks and/or more than one object property data value may be identified in one or both blocks. In such an example, the object property data may be assigned on a conditional basis (for example, data identified in block 104 may take precedence over data identified in block 106, or vice versa, or data associated with a location closer to a surface may take precedence over data specified at more internal position, or the like), or a combination of the object property data values may be assigned to the print addressable location. This is discussed in greater detail below.

Figure 2:
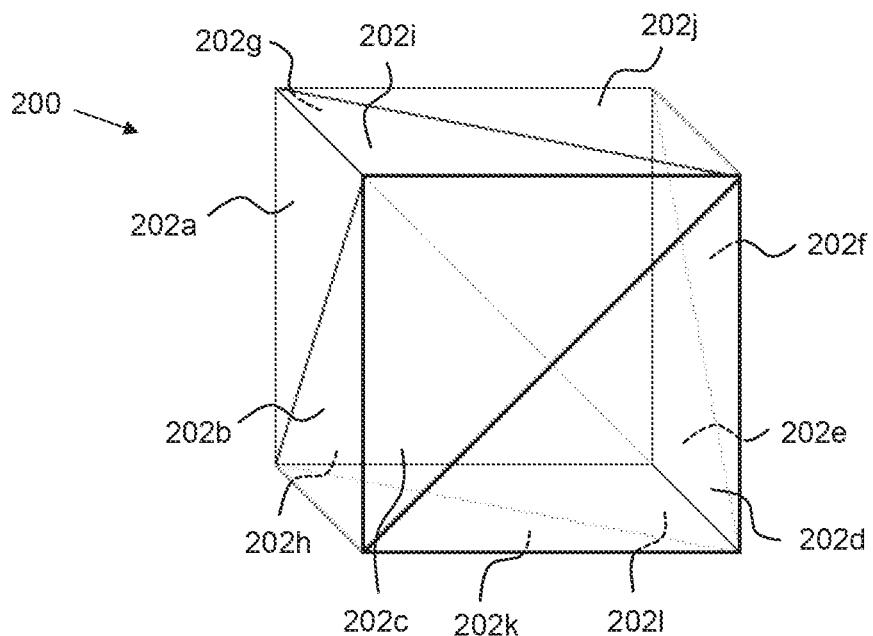
FIG. 2 is an example of a method of generating polygons representing a slice of an object model.
Figure 2:
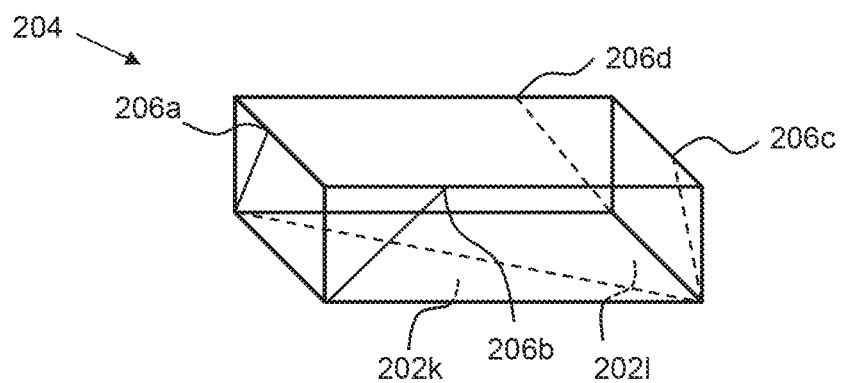
Figure 2:
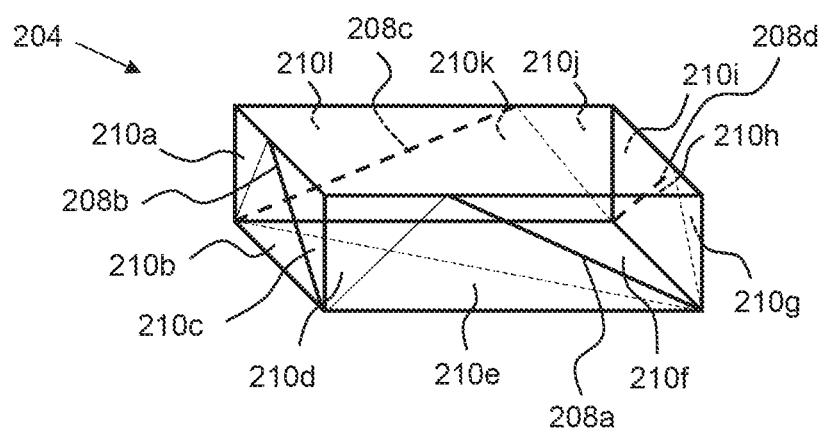

FIG. 2 schematically shows how a slice of an object may be generated from an object model, which in this example comprises a cube 200. In this case, a triangular mesh representing the surfaces of the cube 200 is used to define the object and therefore each of the six faces of the cube 200 is represented by two triangles 202*a-l*.

A slice 204 of the object is formed between two planes, which may be placed so as to be one voxel, and/or one manufacturing layer, apart. In this example, the slice is the lowermost slice of the object model and therefore includes the bottom face of the cube 200. The slice 204 may then be 're-meshed' for example, as follows.

A 2-manifold (or 2D) mesh such as the triangular mesh of FIG. 2 in 3D space can be thought of as having elements of zero dimensions, or 0D (i.e. the vertices), one dimension 1D (i.e. edges) or two dimensions, 2D (i.e. faces). In some examples, all original vertices (0D), edges (1D), and faces (2D) of the initial mesh are maintained, but they may be segmented. In one example, there may be three 'rules' to the re-meshing process:
  (i) where a vertex (0D) is intersected by an intersecting-plane, the vertex is retained;
  (ii) where an edge (1D) is intersected by an intersecting-plane, the edge is segmented, and a vertex (0D) is added; and
  (iii) where a face (2D) is intersected by an intersecting-plane, the face is segmented and an edge (1D) is added.

While in this example, an initial mesh of the surface and a re-mesh of the surface of a slice are considered, in other example, other meshes (e.g. a 3-manifold mesh such as a tetrahedral mesh wherein the tetrahedrons are made up of polygons) may be treated in a similar manner.

As the triangles 202*k* and 202*l* of this face are wholly contained within the slice 204, they are maintained unchanged. However, the triangles on the faces have been transected by a plane and therefore new triangles may be formed, in this example by defining new vertices 206*a*-206*d* where an edge of an initial triangle intersects a plane, and adding new edges 208*a*-208*d* to define new triangles 210*a-l*.

Thus in this example, the slice 204 is represented by a total of fourteen triangles, two of which were contained within the initial mesh. All edges of the initial mesh which are contained within the slice 204 are preserved. If however the next slice up was considered, the diagonal edge of each of the initial triangles would be transected twice, leading to the creation of two new vertices per side. Such a slice would be represented by sixteen triangles (four on each side, but being 'open' on the top and bottom faces).

In another example, a series of infinitesimal planes may be considered individually. However, this may miss details such as surfaces (in particular if done in increments of the object slice height), and therefore a 2D representation of the properties (e.g. texture mapping and the like). In such a method, the color assigned to voxels may be incorrect, and the object may not appear as intended. The methods set out herein consider such a series of infinitesimal planes in pairs and the volume between their planar intersections, and in turn addresses the volumes between the planes.

In other example, the slices and the meshes thereof may be formed in some other way, for example natively in designing a model of a 3D object.

A mapping between the object property data and the generated polygons may be determined. For example, the object property data may have originally been determined to associate locations in a 2D representation of object property data to corners (vertices) of the polygons, and any data relating vertices within the slice may be maintained. Moreover, a mapping between locations in the 2D representation and the new vertices of the polygons of the slice 204 may be determined.

In one example, as set out above, a 2D representation of property data may comprise a bitmap having a uv coordinate system. In such an example, the properties may be given at the polygon vertices, and then derived or interpolated for all other points (e.g., for the three edges or the face of a given polygon, the properties at any point may be linearly interpolated from the vertices). Since the uv coordinates are stated at vertices, determining a new mapping may comprise determining a mapping for just new vertices which have been created in a re-meshing process. This may for example comprise determining an interpolation of a property between an original edge's vertices (i.e. the two vertices each having an association with a uv specification) according to the position of the new vertex added. In such an example, the result is the same uv coordinate result that point on the edge would have even if it had not been segmented, which therefore give equivalent properties at that point: in other words, in such an example, the model is not substantively changed by the segmentation, but explicit mappings are now held at both the original vertices and any new vertices within the slice.

Figure 3:
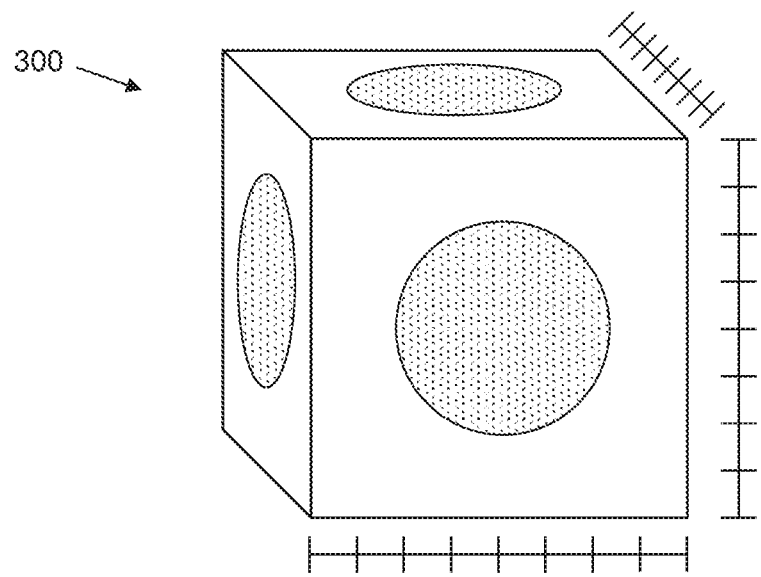
FIG. 3 is an example of an object which may be formed into slices.

An example in relation to blocks 104 and 106 is explained further in relation to FIG. 3. FIG. 3 shows a representation of a cube 300 having side lengths of eight voxels. It may be noted that, in practice, objects may generally be formed of a greater number of voxels and that the example of eight voxels is used simply to explain the principles set out herein. The cube 300 is associated with two color surface pattern, such that each side comprises two regions, a first 'background' region bearing one color and a second foreground region bearing a circle in a second color. In other examples, more complex patterns may be formed, and properties other than color may vary over the surface, or over the object as a whole.

Such a cube 300 may be formed into eight voxel-height slices, the lowermost of which will contain the bottom face and a portion of each side face, the 6 intermediate slices comprising portions of the side faces and the uppermost slice comprising the upper face and a portion of each side face.

Considering the lowermost slice and the example of FIG. 2, the base of this may be represented by two triangles, each being associated with a triangle of the pattern shown on that side.

As described above, block 104 comprises inspecting the slice from a predetermined perspective at a plurality of discrete locations and determining if each location is within a face of a polygon. In this example, a location is selected to be at the centre of each of the 64 voxels making up the base. Therefore, each voxel is inspected and as the triangles cover the base, each voxel may be associated with a property taken from the property data. In this example, this may comprise a selection of a color from a texture map, or a bitmap, or any other object property data associated with an object and associating the object property data at that location with the location and therefore the voxel (i.e. in this example, one of the background color and the foreground color will be selected for each voxel in the first slice). In this example, the edges may be considered to have zero width and therefore every location may be associated with one of the two triangles and one of the foreground color and the background color taken from a corresponding location of the texture map may be selected and assigned to the voxel.

Block 106 comprises inspecting the slice at a plurality of discrete locations along an edge of a polygon, and associating the object property data associated with a polygon having the edge with that location. In this example, the association is conditional on whether the location has already been associated with object property data in block 104: if so, that selection is associated to the voxel and if not, the property identified in block 106 is assigned to the voxel. In other examples, other rules may be applied. For example, the priority may be reversed, or property data may be assigned to the location based on a function combining object property data associated therewith (for example a weighted average of object property data identified in block 104 and object property data identified in block 106), or the like. In relation to the lowermost slice, this may comprise considering the edges of the triangles 202k and 202l of the bottom face and the edges of the triangles 210a-l of the sides as shown in FIG. 2. However, in this example, as the slice is one voxel high, and all voxels have been associated with property data in block 104, there is no 'empty' voxel to populate, and therefore no further action is taken at this point.

However, for an intermediate slice, the sides are vertical and therefore may not be detected by the inspections of block 104. In that case, an outer square annulus of voxels may be populated with property data taken from the texture map by 'walking' along each of the edges of the polygons (in this case, 16 triangles would be formed as noted above) and, with a spacing such that each voxel is inspected, determining if there is object property data associated with such a location.

While in this example the sides are vertical, steeply sloped side portion may also be missed in the inspections of block 106. It is also possible that voxels in a face parallel to an xy plane may be missed, since, due to rounding in xy location, it may be that a voxel is missed in a corner case that could line up with, for example, a vertical edge.

Therefore, in one example, this provides a method of associating property data, which may be represented in 2D map, with discrete locations, while ensuring that all locations are inspected. Moreover, by assigning data in the manner described, a hierarchy may be established (e.g. assign data from inspection of the faces first and from edges to voxels which have not been assigned data from inspection of the faces). This may resolve any ambiguities associated with the possible property data for a location (for example the property data for a corner voxel could take the property of any side, but the methods set out herein provide for a hierarchy of the sides.)

In another example, rather than providing a hierarchy, there may be a function applied to the possible outcomes for a given voxel (for example, a simple average or a weighted function). In some examples, there may be a set of rules (heuristics) to determine the final voxel property from the identified properties.

In other words, in some examples, the property data associated with a particular location may be based on a set of rules, which may be context dependent. For example, given a first set of input conditions, any object property data identified according to the process of block 104 may take precedence over any object property data identified according to the process of block 106, and be attributed to the voxel alone. For another set of input conditions, the reverse may be true. For still another set of input data, an average (which may be a weighted average) of the object property data identified according to the processes of both blocks 104 and 106 may be attributed to the voxel, or the like. Some such rules are further discussed in relation to FIG. 5 below.

Figure 4:
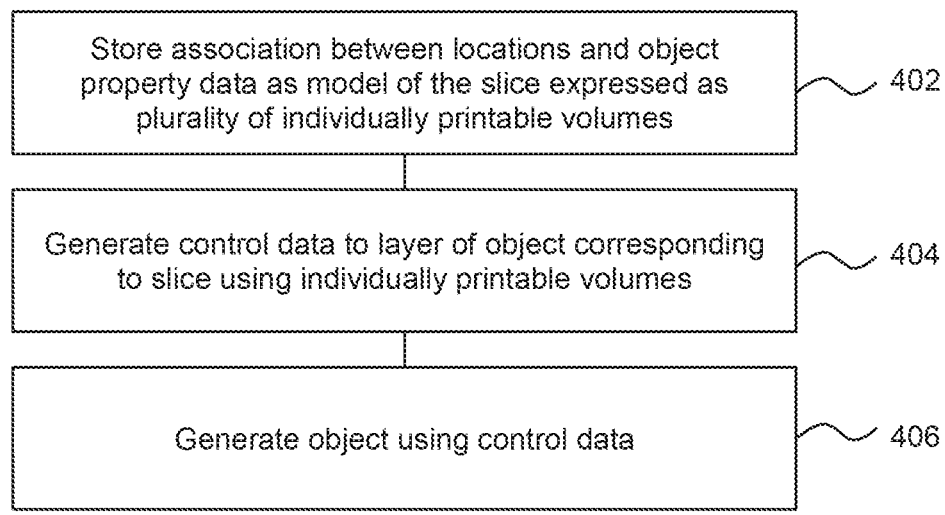
FIG. 4 is an example of a method of generating an object.

FIG. 4 is an example of a method for printing an object, which may be carried out following the method of FIG. 1. Block 402 comprises storing the association between the locations and the object property data in a non-volatile manner as a model of the slice expressed as a plurality of individually printable volumes (i.e. voxels). This may be termed a voxel representation of the slice. In some examples, where an interpolated value or an average or some other combination of object property data is determined, that determined object property data may be associated with the location and stored.

Block 404 comprises generating control data to generate an object layer corresponding to the slice of the object model using the individually printable volumes. For example, a voxel at a given location may have at least one specified property associated therewith: for example, it may have a particular color, transparency, conductivity, strength or the like. Properties need not be specified for all voxels, and in some examples at least some voxels may be associated (for example in the absence of a specification of a property) with a default property. A print agent or combination of print agents to provide such a property may be determined, for example each property or combination thereof may map, via a look-up table or the like to a print agent or print agent combination to apply to a location corresponding to the voxel. In some examples, a halftoning process may be used to determine where print agent drops may be applied within the physical representation of the voxel.

Block 406 comprises generating the object using the control data. For example, this may comprise forming successive layers of build material on a print bed and applying print agent according to the control data for that layer and exposing the layer to radiation, resulting in heating and fusion of the build material.

As the data representing the object may be expressed in broadly self-contained 'slices', each of these slices may be processed independently of another, leading to efficient use of processing resources, for example by parallelisation.

Figure 5:
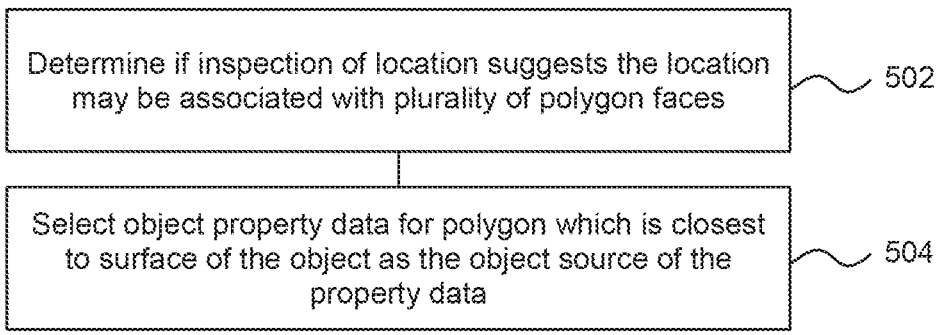
FIG. 5 is an example of a method for associating object properties with locations in object model data.

FIG. 5 is an example of method of resolving a situation in which there may be more than one property associated with a location, and in this example comprises an example of a method of carrying out block 104 (although similar principles may be applied in relation to block 106, and/or to combining properties identified in both blocks). For example, in the analogy of the 'ray' inspection provided above, there may be a plurality of polygons intercepted. Block 502 comprises determining if an inspection of a location suggests that the location may be associated with a plurality of polygon faces and, if so, in block 504 selecting the object property data for the polygon which is closest to the surface of the object as the object source of the property data.

This is just one example of how one of a plurality of possible properties may be selected. In other examples, an arbitrary z distance may be selected over another (e.g. closer to the top of an object), or a likely user perspective may be considered (e.g. closer to a likely viewing position of a user). In other examples, an intermediate (e.g. interpolated) property may be assigned to such a location. In some examples, where multiple properties are identified, a property assigned to the voxel may be assigned based on a weighted combination, for example based on optical modelling as a function of distance from the surface. In some examples, similar methods may be utilised when selecting which, or how, one or more properties identified in block 104 or 106 are associated with a voxel.

More generally, described above, there may be a plurality of hierarchies and/or rules for associating a voxel with a property where more than one object property data is identified for a single voxel, and the selection of a particular method may be context dependent.

Figure 6:
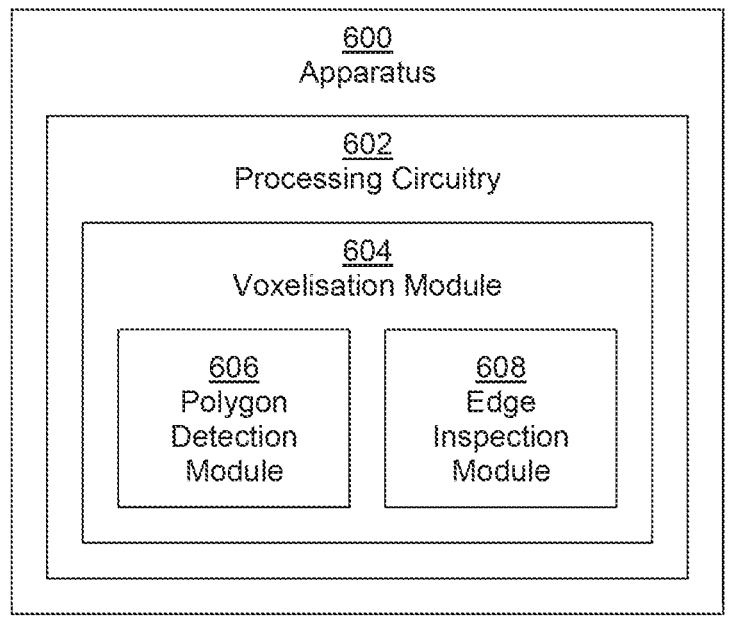
FIGS. 6 and 7 are examples of apparatus for processing data relating to additive manufacturing.

FIG. 6 is an example of an apparatus 600 comprising processing circuitry 602. In this example the processing circuitry 602 comprises a voxelisation module 604 comprising a polygon detection module 606 and an edge inspection module 608. The modules 604, 606 and 608 may be provided, in some examples, by one or more processors executing machine readable instructions.

In use of the apparatus 600, the voxelisation module 604 defines a plurality of voxels representing an object to be generated in additive manufacturing, wherein at least one voxel is associated with at least one object property (and in some examples with a combination of object properties). To that end, the polygon detection module 606 associates at least one voxel with an object property of a polygon representing the object (and in some examples representing the surfaces thereof) when, from a predetermined perspective, a voxel overlies the polygon or contains at least part of the polygon face, for example as set out above in relation to block 104. The edge inspection module 608 inspects a plurality of discrete locations along an edge of a polygon and associates at least one voxel with an object property of a polygon comprising the edge when the location lies within the voxel, for example as set out above in relation to block 106. In some examples, and as has been discussed above, the association of an object property by the voxelisation module 604 may be object properties determined using a function, for example a weighted average of object properties identified for that voxel by one or both of the polygon detection module 606 and the edge inspection module 608. In other examples, the association of an object property by the voxelisation module 604 may be may be conditional on a property in a higher ranking object property identification process in a hierarchy (e.g. carried out by one of the polygon detection module 606 and the edge inspection module 608) having identified no object property, or the like.

In some examples, the object is represented in data modelling each of a plurality of slices of the object and the voxelisation module 604 is to process data modelling one slice at a time.

Figure 7:
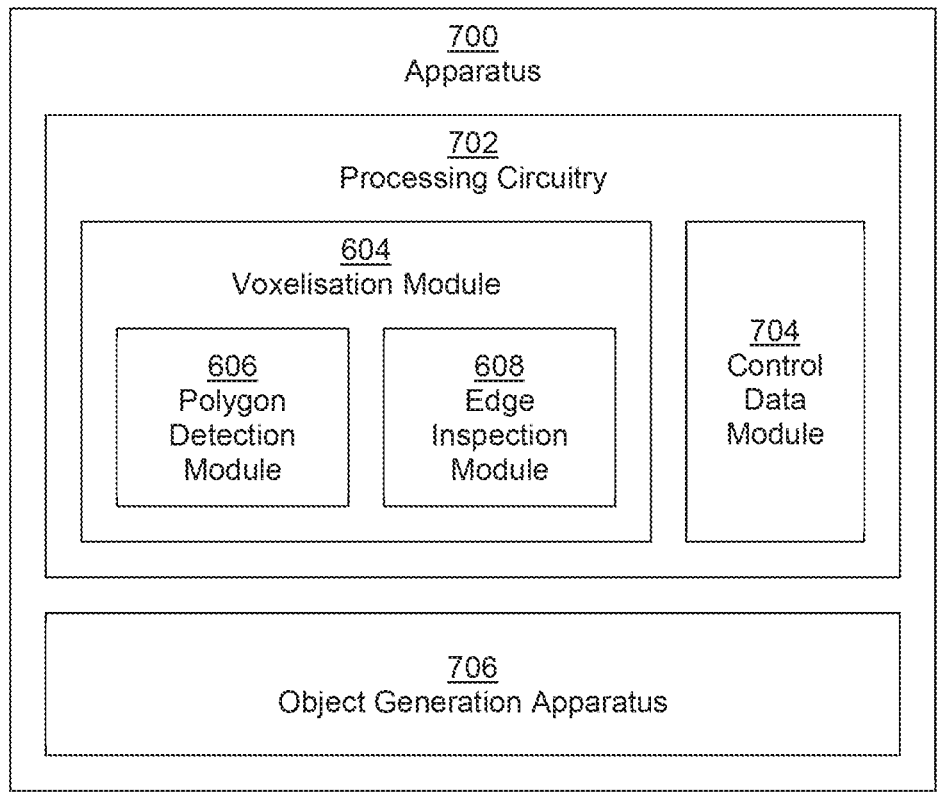

FIG. 7 shows an example of an apparatus 700 comprising processing circuitry 702 which comprises the voxelisation module 604 comprising a polygon detection module 606 and an edge inspection module 608 of FIG. 6, and further comprises a control data module 704 to generate control data to generate the an object layer corresponding to a slice of the object model (which may be one voxel thick). The apparatus 700 further comprises object generation apparatus 706 to generate the object in a plurality of layer corresponding to respective slices according to the control data.

In use of the apparatus 700, the control data module 704 may generate control data for generating an object based on the representation of the object as a plurality of discrete voxels. For example, properties or combinations of a voxel may map, via a look-up table or the like, to a print agent or print agent combination to apply to a physical location corresponding to the voxel of the object model. In some examples, a halftoning process may be used to determine where print agent drops may be applied.

The object generation apparatus 706 is to generate the object according to the control data, and may to that end comprise additional components such as a print bed, build material applicator(s), print agent applicator(s), heat source(s) and the like, not described in detail herein.

Figure 8:
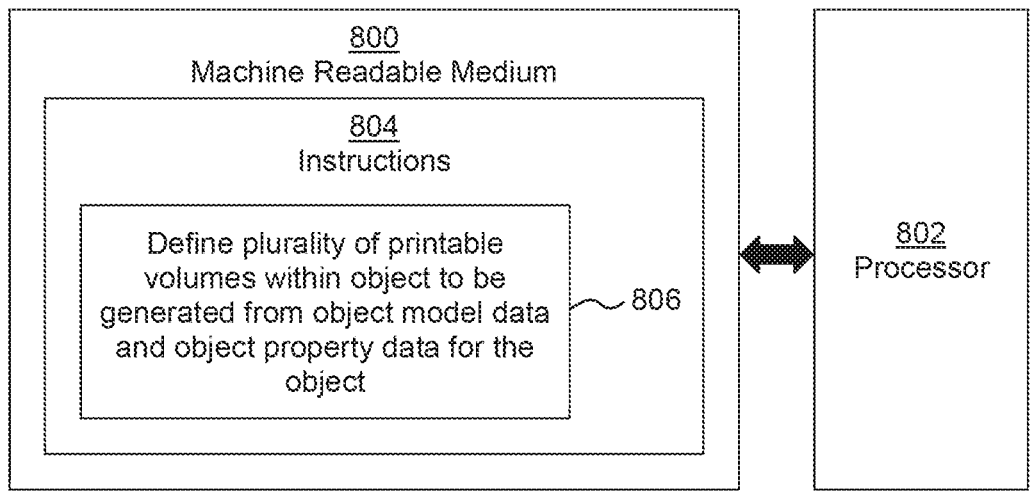
FIG. 8 is an example of a machine readable medium in association with a processor.

FIG. 8 is an example of a tangible, non-volatile, machine readable medium 800 in association with a processor 802. The machine readable medium 800 stores instructions 804 which may be stored in an non-volatile form and which, when executed by the processor 802, cause the processor 802 to carry out processes. The instructions 804 comprise instructions 806 to define a plurality of printable volumes (i.e. 'voxels') within an object to be generated in additive manufacturing from object model data and object property data for the object, the object model data representing a slice of the object model as a plurality of polygons and the object property data comprising an object property bitmap associated with the plurality of polygons. The defining comprises:

(i) inspecting the slice from a predetermined perspective at a plurality of discrete locations and determining if each location is within a face of a polygon, and if so, identifying the object property bitmap associated with that polygon and associating a spatially corresponding portion of the object property bitmap with a printable volume comprising that location; and (ii) inspecting the slice at a plurality of discrete locations along an edge of a polygon and associating a spatially corresponding portion of the object property bitmap with a printable volume comprising that location.

In some examples, and as has been discussed above, the association of an object property may be via a function, for example a weighted average of other object properties identified for that voxel, or may be conditional on a property in a higher ranking object property identification process in a hierarchy having identified no object property, or the like.

In some examples, the instructions 804 may comprise instructions to cause the processor 802 to generate the slice of the object model from data modelling the object as a plurality of initial polygons and generating new polygons modelling the slice, for example as discussed in relation to FIG. 2 above.

In some examples, the instructions 804 may comprise instructions to cause the processor 802 to generate control instruction to generate an object using the defined printable volumes. The instructions 804 may comprise instructions to carry out at least parts of the methods described in relation to FIGS. 1 to 5 above.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that various blocks in the flow charts and block diagrams, as well as combinations thereof, can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices (such as the voxelisation module 604, polygon detection module 606, an edge inspection module 608 and/or control data module 704) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

We claim:

1. A method comprising:
    acquiring, at a processor, a data model of an object to be generated in additive manufacturing, the data model comprising object model data representing a slice of the object as a plurality of polygons and object property data comprising property data associated with the plurality of polygons;
    using the processor, inspecting the slice from a predetermined perspective at a plurality of discrete locations and determining if each location is within a face of a polygon, and if so, identifying the object property data associated with that polygon and associating the identified object property data with that location, wherein if the inspection determines that the location is within a plurality of polygon faces, selecting the object property data for the polygon which is closer to a surface of the object; and using the processor, inspecting the slice at a plurality of discrete edge locations along an edge of the polygon, identifying the object property data associated with each edge location and associating the object property data identified with that edge location.

2. The method according to claim 1, further comprising storing the association between the locations and the object property data as a model of the slice expressed as a plurality of individually printable volumes, each printable volume having associated object property data.

3. The method according to claim 2, further comprising generating control data to generate a layer of the object corresponding to the slice using the individually printable volumes.

4. The method according to claim 3, further comprising generating the object using the control data.

5. The method according to claim 2, further comprising, if a plurality of object property data values are identified for an individually printable volume, determining an object property data value for the individually printable volume according to at least one of a hierarchy or a combination of the object property data values.

6. The method according to claim 1, further comprising, at each edge location, converting a floating-point location into an individually printable volume.

7. The method according to claim 1, further comprising generating the slice of the object model from data modelling the object as a plurality of initial polygons and generating new polygons modelling the slice.

8. An apparatus comprising:
a processing circuitry; and
a memory storing instructions that when executed by the processing circuitry cause the processing circuitry to:
acquire a data model of an object to be generated in additive manufacturing the data model comprising object model data representing a slice of the object as a plurality of polygons and object property data comprising property data associated with the plurality of polygons:
inspect the slice from a predetermined perspective at a plurality of discrete locations and determine if each location is within a face of a polygon, and if so, identify the object property data associated with that polygon and associate the identified object property data with that location, wherein if the inspection determines that the location is within a plurality of polygon faces, select the object property data for the polygon which is closer to a surface of the object; and inspect the slice at a plurality of discrete edge locations along an edge of the polygon, identify the object property data associated with each edge location, and associate the object property data identified with that edge location.

9. The apparatus according to claim 8, wherein the object is represented in data modelling each of a plurality of slices of the object and the processing circuitry processes data modelling one slice at a time.

10. The apparatus according to claim 9, wherein the instructions further cause the processing circuitry to generate control data to generate the object.

11. The apparatus according to claim 10, wherein the instructions further cause the processing circuitry to generate the object in a plurality of layers corresponding to respective slices according to the control data.

12. A non-transitory machine readable medium storing instructions which when executed by a processor cause the processor to:
acquire a data model of an object to be generated in additive manufacturing, the data model comprising the object model data representing a slice of the object as a plurality of polygons and object property data comprising an object property bitmap associated with the plurality of polygons;
inspect the slice from a predetermined perspective at a plurality of discrete locations and determine if each location is within a face of a polygon, and if so, identify the object property bitmap associated with that polygon and associate a spatially corresponding portion of the object property bitmap with a printable volume comprising that location, wherein if the inspection determines that the location is within a plurality of polygon faces, select the object property bitmap associated with the polygon which is closer to a surface of the object; and
inspect the slice at a plurality of discrete edge locations along an edge of the polygon and associate a spatially corresponding portion of the object property bitmap with a printable volume comprising that location.

13. The non-transitory machine readable medium according to claim 12, wherein the instructions which when executed further cause the processor to:
generate the slice of the object from data modelling the object as a plurality of initial polygons by generating new polygons modelling the slice.

14. The non-transitory machine readable medium according to claim 12, wherein the instructions which when executed further cause the processor to:
define printable volumes within the object from the object model data and the object property data; and
generate control instruction to generate the object using the defined printable volumes.

* * * * *